Feb. 6, 1962   J. L. QUINN   3,020,524
MULTIPLE INPUT SENSING APPARATUS
Filed Dec. 16, 1957   3 Sheets-Sheet 1
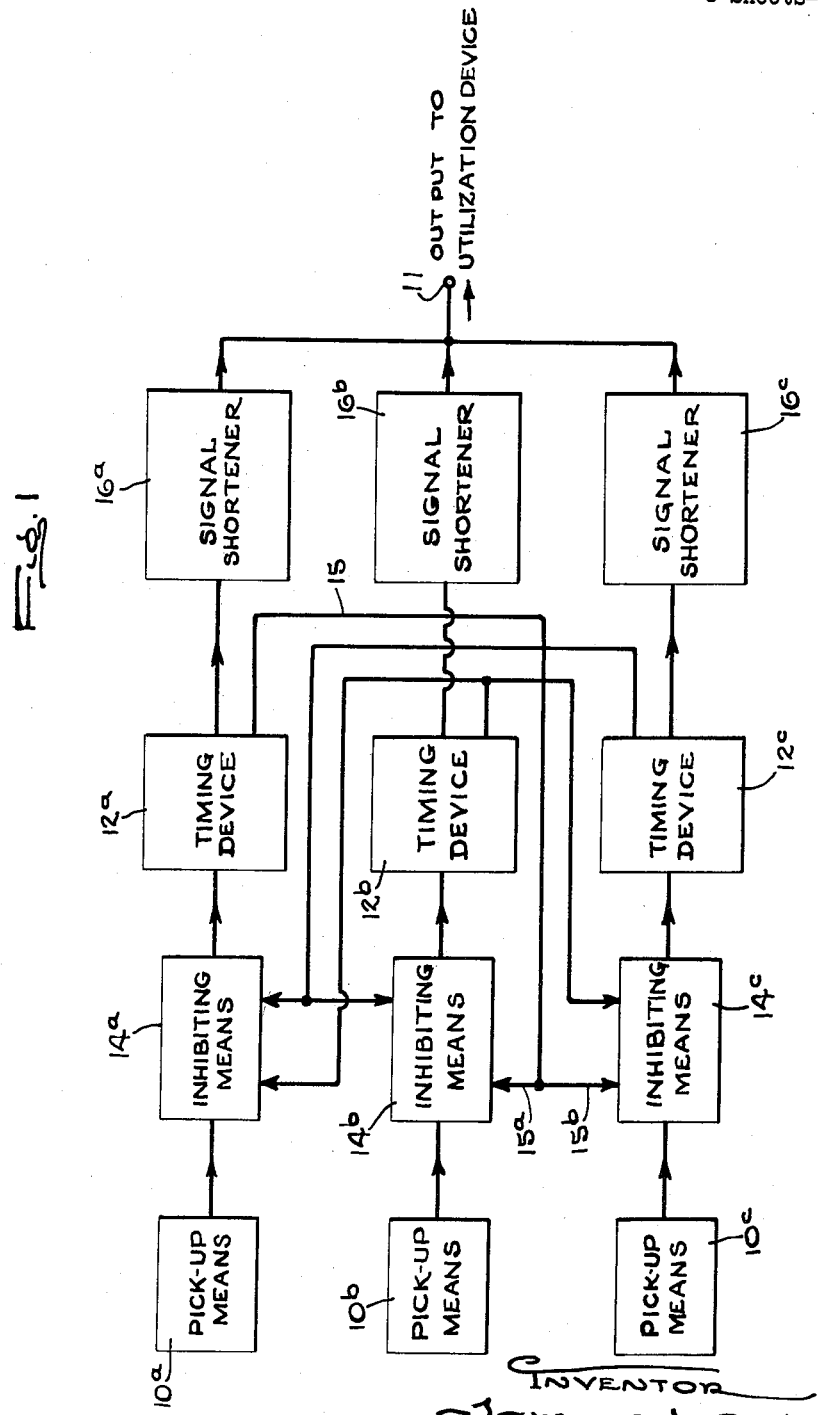

Feb. 6, 1962 J. L. QUINN 3,020,524
MULTIPLE INPUT SENSING APPARATUS
Filed Dec. 16, 1957 3 Sheets-Sheet 2
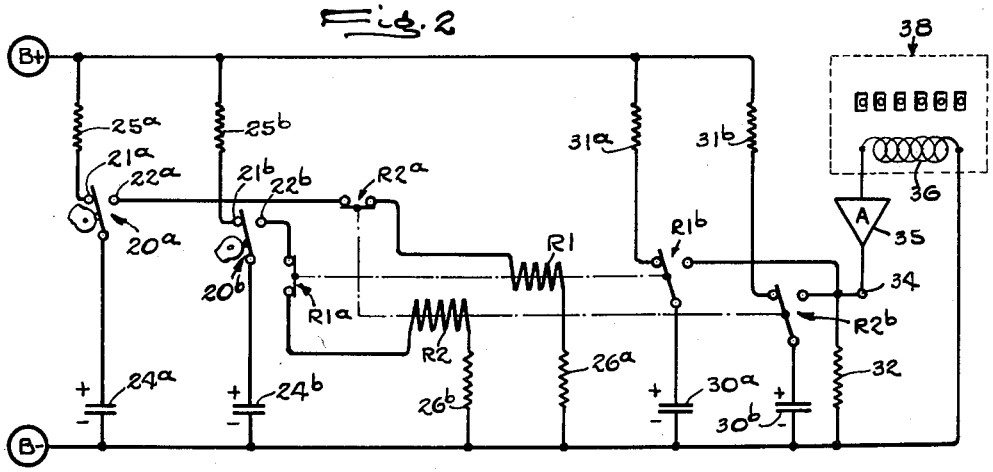
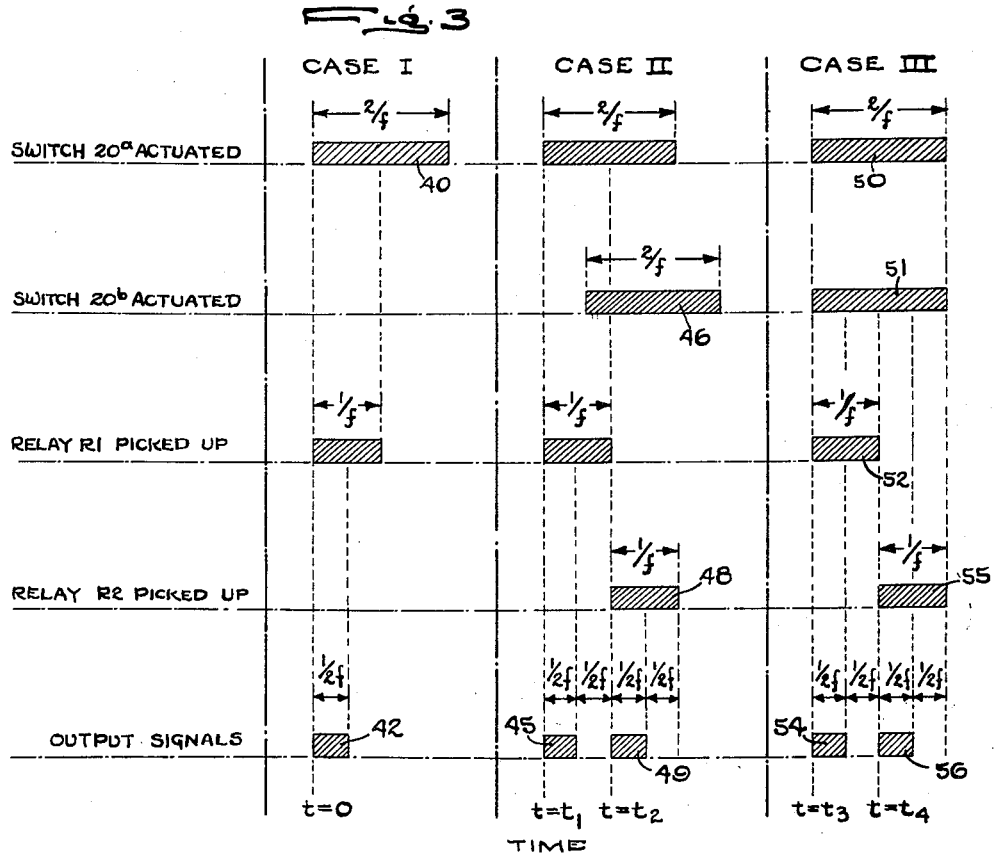
INVENTOR
James L. Quinn
by Carlson, Pitzner, Hubbard & Wolfe
ATTORNEY

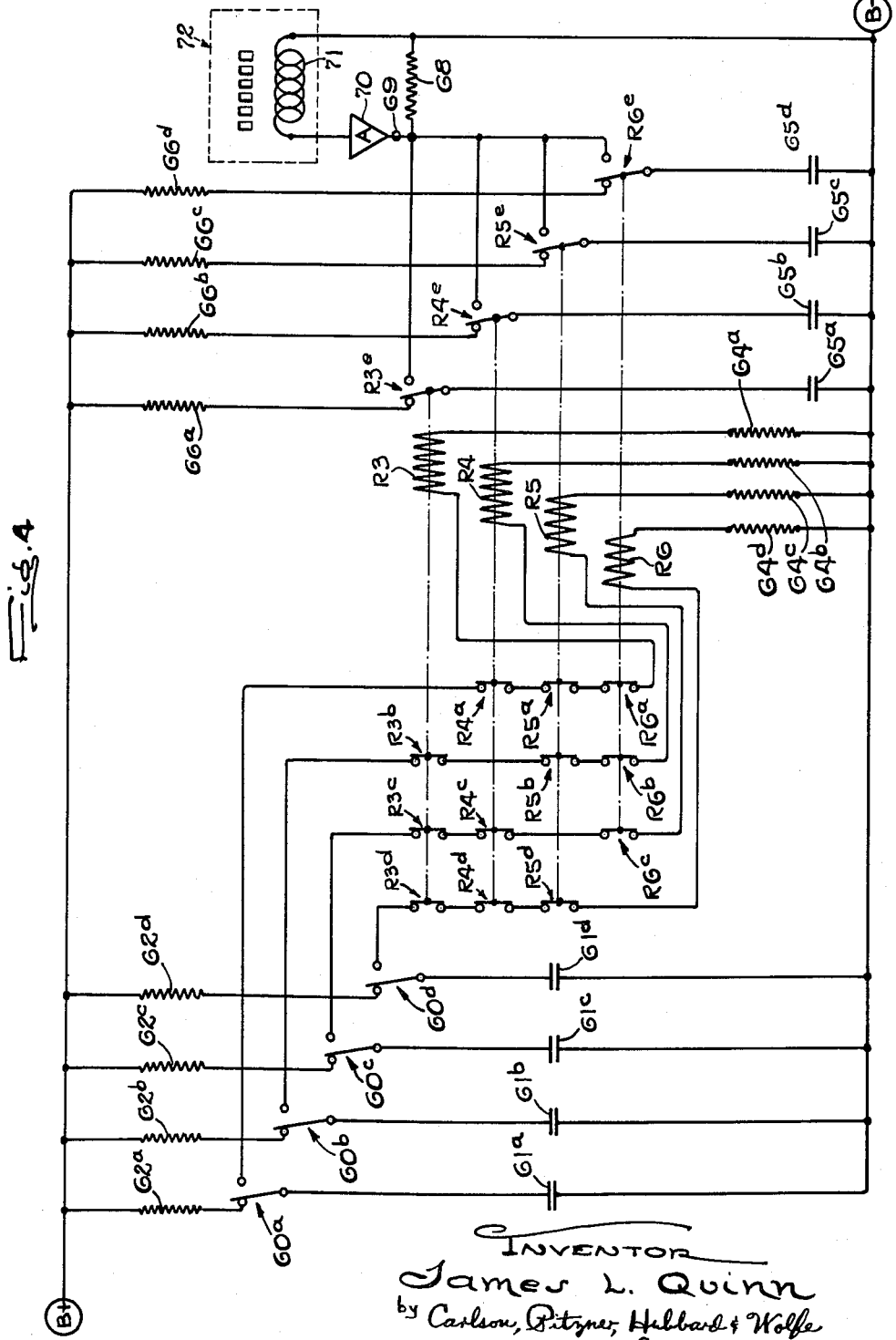

United States Patent Office 3,020,524
Patented Feb. 6, 1962

3,020,524
MULTIPLE INPUT SENSING APPARATUS
James L. Quinn, Chicago, Ill., assignor to Cummins-Chicago Corp., Chicago, Ill., a corporation of Illinois
Filed Dec. 16, 1957, Ser. No. 702,924
7 Claims. (Cl. 340—147)

The present invention relates to sensing and signaling apparatus, and has for its general aim to make possible the generation of one discrete output signal for each event in a plurality of series of randomly occurring events taking place at different locations.

More specifically, it is an important object of the invention to create a series of individual, time-spaced output signals corresponding in number to the total of all events which take place successively at a plurality of different points or locations, even though the events at two or more locations (1) are spaced apart in time, (2) partially overlap in time, or (3) exactly coincide in time.

Another object of the invention is to provide multiple input sensing apparatus which can easily be adapted to have the proper timing of operation of its various components, based upon the maximum frequency of output signals for accurate response thereto, and the maximum frequency of events occurring at any one of several locations.

A related object is to provide such apparatus in which the "on-to-off" time ratio of the output signals, for a given frequency and period of such signals may be readily adjusted to suit the requirements of the device which is to utilize those signals.

It is a further object to provide such apparatus which involves a relatively simple organization of rugged, inexpensive components, nevertheless producing very reliable high-speed operation.

Other objects and advantages will become apparent as the following description proceeds, taken in conjunction with the accompanying drawings, in which:

FIGURE 1 is a block and line diagram showing the organization and functional relationship of the principal components of apparatus embodying the features of the invention;

FIG. 2 is a schematic diagram of an exemplary form of the invention having dual inputs;

FIG. 3 is a timing chart illustrating the operation of the apparatus shown in FIG. 1; and FIG. 4 is similar to FIG. 2, but illustrates exemplary apparatus having four inputs.

While the invention has been shown and will be described in some detail with reference to particular embodiments thereof, there is no intention that the invention thus be limited to such detail. On the contrary, it is intended here to cover all modifications, alternatives, and equivalents falling within the spirit and scope of the invention as defined by the appended claims.

Referring now to FIG. 1, the invention as there diagrammatically illustrated is intended to sense events occurring at a plurality of $n$ locations by means of a corresponding plurality of $n$ pick-up devices; and to provide in response to each such event one output signal which is spaced in time from all other output signals. As illustrated in FIG. 1, the apparatus is intended to sense events occurring at three different locations (i.e., $n=3$), and for this purpose three pick-up means $10a$, $10b$ and $10c$ are utilized, each being actuated in response to each event occurring at the three respective locations. While the events occurring at the three locations may be spaced apart in time, partially overlap in time, or exactly coincide in time, a train of output signals will be produced at an output terminal 11, there being one output signal for each such event.

As an example of the many advantageous uses of the invention, consider a situation where products are delivered successively, but at random intervals over a plurality of conveyors leading from a corresponding plurality of assembly lines. It is very often desirable to establish a running count of the total number of products delivered from all of the assembly lines. If a single counting device were associated with each assembly line conveyor, then it would be necessary to inspect all three counters and to sum the readings thereof in order to arrive at the desired total count. By utilizing the present invention, the plural pick-up means $10a$, $10b$, $10c$ can each be actuated in response to each product being delivered from a corresponding one of the assembly lines, and the output signals appearing on the terminal 11 (FIG. 1) can be supplied to a utilization device in the form of a single counter which will then always display a running count or total of the products delivered from all of the assembly lines.

A most critical problem arises in attempting to drive a single counter directly from a number of pick-up means, since if events at different locations occur simultaneously, the pick-up signals will coincide and produce only one response at the counter. The present invention successfully solves this problem.

The several pick-up means such as diagrammatically illustrated at $10a$, $10b$, and $10c$ in FIG. 1 may take a variety of forms. In the example given above, they may be embodied in the form of simple limit switches which are mounted on delivery conveyors and arranged to be actuated by each product as it passes by. It will be readily understood, however, that the pick-up means may also take the form of photoelectric cells, inductive or capacitive devices sensitive to changes in magnetic or dielectric paths, or other such devices. All that is required is that the pick-up means be actuated when an event, of whatever nature, occurs; and that the pick-up means be de-actuated between successive events.

Associated with each of the pick-up means $10a$, $10b$ and $10c$ is a time measuring device $12a$, $12b$ and $12c$. These devices, which for brevity will be termed "timing devices" are normally dormant or inactive. They are responsive, however, to actuation of the corresponding pick-up means to measure off a time interval or timing cycle of a predetermined duration, as will be explained below.

The timing devices may take a variety of forms well known to those skilled in the art, and a specific example will be described hereafter. All that is required is that the timing device provide a response or manifestation extending over a time interval or period when it is going through a timing cycle.

In further carrying out the invention, means are provided to inhibit or prevent the operation of each of the timing devices $12a$, $12b$ or $12c$ so long as any other of those timing devices is actuated, i.e., going through a timing cycle. For this purpose, inhibiting means 14a, 14b and 14c are employed, as exemplified in FIG. 1, being inserted between each of the pick-up means and its corresponding timing device to prevent actuation of the latter if one of the other timing devices supplies a signal or manifestation to such inhibiting means. It will be seen from FIG. 1 that if the timing device 12a is going through a timing cycle, a signal or manifestation is supplied over interconnections 15, 15a and 15b to inhibiting means 14b, and 14c. The latter in response to such signal or manifestation prevent actuation of the timing devices 12b and 12c even though their corresponding pick-up means 10b and 10c may at that time be actuated. In like manner, if the timing device 12b is going through a timing cycle, the inhibiting means 14a and 14c will prevent actuation of timing means 12a or 12c. And if the timing device 12c is going through a timing cycle, the inhibiting means 14a and 14b will prevent actuation of the timing means 12a and 12b.

Such inhibiting means may take a variety of forms known to those skilled in the art. For example, they may be electronic gates, or interlocking relay contacts, as will be clear from the following description of FIG. 2.

Finally, means are provided to create, in response to the actuation of each of the timing devices a signal which is shorter in duration than the cycle of such timing devices. As shown in FIG. 1, three signal shorteners 16a, 16b and 16c are associated with the three timing devices, and each is appropriately interconnected with a corresponding one of the timing devices 12a, 12b, and 12c to be actuated when the latter begins its timing cycle. In response to the initiation of a timing cycle by each of the devices 12a, 12b or 12c, the corresponding signal shorteners 16a, 16b and 16c will produce an output signal or manifestation which is of shorter duration than the timing period of the timing devices.

The signal shorteners may also take a variety of forms which will be apparent to those skilled in the art, particularly after one specific form is described hereinafter with reference to FIG. 2. The shortened signals from the three shorteners 16a, 16b and 16c may be passed to the common output terminal 11 and thus constitute the output signals for the entire apparatus.

To review the operation in general, it will be seen that each of the pick-up means 10a, 10b and 10c is actuated in response to an event occurring at a corresponding one of three locations. When each pick-up means is actuated, it actuates the corresponding timing device 12a, 12b or 12c. However, due to the operation of the inhibiting means 14a, 14b and 14c only one of the timing devices can be going through a timing cycle at any given instant. Therefore, if two of the pick-up means are actuated at the same time, one of the timing devices will be actuated until its timing cycle is completed, after which the other timing device will be actuated. Since only one of the timing devices can be actuated at a given time, only one of the signal shorteners 16a, 16b or 16c will be actuated at a given time so that for each event sensed by the pick-up means, one output signal spaced in time from the other will appear at the output terminal 11.

Before proceeding to a description of one detailed embodiment of the invention, it will be helpful to outline the general timing requirements. If it is assumed that the utilization device (not shown in FIG. 1) which receives output signals from the terminal 11 (FIG. 1) can accommodate signals having a maximum frequency of $f$ signals per second, then it is necessary to make the timing devices having a timing cycle equal to at least $1/f$ seconds. Then, to assure that the pick-up means 10a, 10b and 10c will properly actuate the timing devices even though the events occurring at different locations occur simultaneously, the pick-up means are so arranged that they will be actuated for a minimum time period of $n/f$ seconds in response to each sensed event, where $n$ is the number of locations at which events are occurring, and correspondingly, the number of pick-up means employed.

FIGURE 2 illustrates, by way of schematic circuit diagram, dual input sensing apparatus embodying the invention. As shown in FIG. 2, the two sensing means are in the form of cam-actuated single pole double throw switches 20a and 20b. When these switches are de-actuated, i.e., not deflected by the associated cams or the like, their movable contacts connect with stationary contacts 21a and 21b, respectively. In the actuated positions, the movable switch contacts connect with stationary contacts 22a and 22b.

The timing devices mentioned above in connection with FIG. 1 are embodied in FIG. 2 in the form of resistance-capacitance discharge circuits, including the coils of a relay in each such circuit, so that each relay is actuated for a predetermined time period or "cycle" when the associated capacitor discharges.

First, means are provided to charge two capacitors 24a, 24b whenever the sensing devices or switches 20a, 20b corresponding thereto are unactuated. For this purpose, the capacitors are connected in series through the normally closed contacts of the switches 20a and 20b and through current limiting resistors 25a, 25b across a suitable D.C. voltage source here conventionally represented by the symbols B+ and B−. Therefore, whenever the switches 21a and 21b are de-actuated between successive events, the capacitors 24a and 24b are charged to the voltage polarity shown by current flow through the resistors 25a and 25b.

As a means for causing a timing discharge of the capacitors 24a and 24b in response to actuation of the corresponding pick-up means or switches 20a, 20b, a circuit is provided in parallel with each of the two capacitors 24a and 24b whenever its corresponding switch 20a or 20b is actuated and closes on the stationary contacts 22a or 22b. As here shown, the discharging circuit for the capacitor 24a includes normally closed relay contacts R2a, the coil of a relay R1, and a resistor 26a. Similarly, the discharging circuit for the capacitor 24b includes normally closed relay contacts R1a, the coil of a relay R2 and a resistor 26b. Thus, after the capacitors 24a and 24b have been charged, actuation of their corresponding switches 20a or 20b will result in a current discharge through the relay coils R1 or R2, respectively, resulting in energization of those respective relays.

The effective duration of such discharge, i.e., the time interval or cycle during which the respective relays are actuated, may be precisely determined by choosing the relative values of the capacitors 24a and 24b and the value of the resistors 26a and 26b, together with the resistances of the relay coils, which establish the time constant of the discharging operation.

The inhibiting means as embodied in FIG. 2 constitute the normally closed relay contacts R1a and R2a. Whenever the relay R1 is energized, by discharge of the capacitors 24a, its contacts R1a will be open, so that the capacitor 24b cannot discharge even though its corresponding pick-up means or switch 20b is actuated. In like manner, the capacitor 24a cannot discharge, and the relay R1 cannot be actuated, whenever the capacitor 24b is discharging and the relay R2 is actuated to open the contacts R2a.

As thus far described, it will thus be seen that two pick-up devices in the form of switches 20a and 20b are employed in FIG. 2. In response to actuation of those switches, timing devices in the form of capacitors discharge through a resistance, and relays actuated for predetermined periods by the discharge current, are employed. In response to actuation of either of the switches 20a or 20b, the relay R1 or R2 will be energized for a predetermined time interval. Yet, if the switches 20a and 20b are both actuated, then only one of the relays R1 or R2 will be actuated, and the discharge of one of the capacitors will be inhibited or delayed until the other capacitor has discharged sufficiently to cause its relay to drop out. To assure that both timing devices are put through one timing cycle, even though the switches 20a and 20b are simultaneously actuated in response to two concurrent events, those switches are arranged to be actuated, in response to each event associated therewith, for a period of time longer than a timing device cycle. Specifically, they are arranged to be actuated for a period at least $n$ times longer than a timing cycle, where $n$ is the number of input devices.

Forming a part of the signal shortening means in FIG. 2 are two capacitors 30a and 30b which are connected to be charged from the voltage source through current limiting resistors 31a and 31b, respectively, in series with normally closed relay contacts R1b and R2b. whenever the relay R1 or the relay R2 is actuated (and they cannot both be simultaneously actuated), then the contacts R1b or the contacts R2b will be moved to connect the capacitor 30a or the capacitor 30b in parallel with a resistor 32. Accordingly, the capacitor 30a or 30b will send a current discharge through that resistor creating a momentary voltage signal thereacross. This signal thus appears between an output terminal 34 and the point of reference potential here shown as B—.

The values of the capacitors 30a and 30b are so chosen with relation to the value of the resistor 32 that these capacitors are discharged in a relatively short time interval, so that the voltage signal appearing at the output terminal 34 is of shorter duration than the time period over which the relay R1 or R2 is energized. Thus, the output signal produced in response to energization of either the relay R1 or R2 is "shortened" and may be, for example, of a duration equal to about ½ of the time period of energization of the relays.

To illustrate one application of the invention, the output terminal 34 is shown in FIG. 2 as connected through an amplifier 35 to the input solenoid 36 of a counting device 38. Each time that a current pulse is supplied through the solenoid 36, the reading on the dials of that counting device increases by one unit.

Even though the pick-up means or switches 20a and 20b are successively closed in random fashion by events occurring at two different locations, there will be one discrete output signal at the terminal 34 for each closure of those two switches. Accordingly, the counter 38 will at any given instant display a reading indicative of the total number of events which have occurred at the two locations corresponding to the switches 20a and 20b.

Assume for the moment that the counter 38 (FIG. 2) can respond faithfully to signals which have a frequency of $f$ cycles per second or less. This means that one of the capacitors 30a and 30b must not discharge through the resistor 32 oftener than $f$ times per second. It may be assumed further that the counter 38 requires that the solenoid 36 be de-energized for a period at least equal to the duration of an energizing signal in order to respond faithfully. Thus, to space the output signals from the terminal 34 by a time interval equal to the duration of such intervals, the time constant of the discharge circuit formed by the capacitor 30a or 30b and the resistor 32 should be chosen so that the effective duration of each discharge occurs in a period of $1/2f$ seconds, leaving at least a period of $1/2f$ seconds between each output signal. But if the two switches 20a and 20b should be actuated simultaneously, yet only one of the relays R1 or R2 be energized due to the inhibiting means, it is necessary that the other relay be energized after the first has completed its timing cycle. For this reason, the values of the capacitors 24a, 24b and the resistors 26a and 26b, together with the resistance of the relay coils, are so chosen that the relays R1 and R2 when actuated remain actuated for a period of at least $1/f$ seconds.

In order that each relay R1 and R2 may be energized for a period of $1/f$ seconds even though the two pick-up switches 20a and 20b close simultaneously, it is necessary to provide that these switches, in response to an event which they sense, remain actuated for a minimum period of $2/f$ seconds. This can easily be accomplished by so forming the cams or actuating arms cooperating with the switches 20a and 20b that they will remain closed for the necessary time interval each time that they are actuated in response to an event being sensed.

Referring now to FIG. 3, a time sequence and duration diagram for the pick-up switches 20a and 20b, as well as the relays R1 and R2 of FIG. 2, is there shown. In the operational situation labeled "Case I," it is assumed that only the switch 20a is actuated in response to an event being sensed. If this actuation of the switch 20a occurs at a time instant $t=0$, it will extend over a period of $2/f$ seconds as shown at 40 in FIG. 3. As soon as the switch 20a is actuated, the relay R1 will almost immediately be picked up as a result of discharging current flowing from the capacitor 24a (FIG. 2) through the normally closed contacts R2a and the coil R1. The relay R1 will remain actuated until the capacitor 24a is almost totally discharged, and by appropriate selection of the discharging circuit constants this period of relay actuation is made to extend over a period of $1/f$ seconds, as shown at 41 in FIG. 3. Also, as soon as the relay R1 is picked up, its contacts R1b will disconnect the capacitor 30a from its charging circuit and reconnect it in parallel with the resistance 32. Accordingly, discharging current through the resistor 32 will create a voltage pulse 42 across the latter, the time constant of the capacitor 30a and the resistor 32 being chosen such that this signal lasts for a period of approximately $1/2f$ seconds.

That portion of FIG. 3 labeled "Case II" depicts the operation of the apparatus shown in FIG. 2 under those circumstances when the pick-up switch 20b is actuated a short time after the switch 20a is actuated. If the switch 20a is actuated at an instant when $t=t_1$, the relay R1 will be picked up and remain actuated for a time period of $1/f$ seconds as previously explained, and as shown at 44. As a result of the actuation of relay R1, the capacitor 30a will discharge through the resistor 32 creating an output signal 45 having a duration of $1/2f$ seconds.

If now before the instant $t=t_2$ that the relay R1 restores, the switch 20b is actuated as illustrated at 46, the capacitor 24b cannot discharge because the normally closed relay contacts R1a will be open. However, at the time instant $t=t_2$ when the relay R1 is de-actuated, then the contacts R1a reclose and the capacitor 24b discharges through the relay coil R2. Thus, the relay coil R2 is actuated for a period of $1/f$ seconds as illustrated at 48 in FIG. 3. Pick-up of the relay R2 causes its contacts R2b to connect the charged capacitor 30b in parallel with the resistor 32, so that the resultant discharge through the latter resistor creates an output signal of $1/2f$ seconds duration, as shown at 49 in FIG. 3. It will, therefore, be seen that even though two events at two different locations occur in very closely spaced time relation and actuate the switches 20a and 20b in overlapping relation, two separate output signals 45 and 49 are produced by the apparatus of FIG. 2.

Finally, the operation of the apparatus in FIG. 2 is illustrated under the heading "Case III" in FIG. 3 for the situation in which both the pick-up switches 20a and 20b are actuated simultaneously beginning at the instant when time $t=t_3$. With the two switches actuated simultaneously as represented at 50 and 51, both the relays R1 and R2 will try to pick up. However, inevitably one will be picked up before the other, thus opening its normally closed contact and preventing pick-up of the other. As illustrated at 52 in FIG. 3, let it be assumed that the relay R1 is energized first. Its contacts R1b will cause the capacitor 30a to discharge through the resistance 32 creating a relatively short output signal, illustrated at 54 in FIG. 3. Then there will be an interval during which no current flows through the resistor 32 while the relay R1 remains actuated through its complete cycle of 1/f seconds. At the time instant t=t₄, the relay R1 will be de-energized due to the fact that the capacitor 24a will have been almost completely discharged. Accordingly, the contacts R1a will reclose and since the switch 20b is already closed as shown at 51, the capacitor 24b will then discharge through the relay coil R2, energizing that relay for a period of 1/f seconds as shown at 55 in FIG. 3. In response to pick-up of the relay R2, its contacts R2a cause the capacitor 30b to discharge through the resistor 32, creating a second relatively short output signal illustrated at 56 in FIG. 3. This output signal 56 is terminated before the relay R2 restores, so that an intervening period of no output signal is created.

It will be seen from the foregoing that the controlling considerations for successful operation are established by Case III, i.e., the possibility that the plural pick-up devices or sensing switches 20a and 20b might be simultaneously actuated. When that happens, those switches have to remain closed for a long enough period of time such that all of the timing devices can go through one cycle of operation. And because those timing devices go through their timing cycles in rapid sequence, it is desirable to make the final output signals at least slightly shorter than the duration of such timing cycles, in order that the output signals will be spaced by time intervals.

As shown by FIG. 3, the two output pulses 54 and 56 are spaced apart in time so that the utilization device can recover from one signal and be ready to respond to the next. However, it may not be necessary to space successive output pulses by time intervals which are equal to or greater than the duration of the output pulses themselves. All that is necessary in order to create a time spacing between successive output pulses is that those output pulses be of less duration than the timing cycles of the timing devices. That is, the output signals may be made to have a duration of $1/kf$ seconds where $k$ is a constant greater than 1. By choosing the relative values of the signal shortening capacitors 30a, 30b and the resistor 32, the proportion of a period, 1/f, which is occupied by an output signal may be appropriately adjusted.

It should also be observed at this point that in some instances it may not be necessary to employ a separate resistor 32 as shown in FIG. 2. That is, the input load of a utilization device, such as the solenoid 36 of the counter 38, could be connected directly in place of the resistor 32. The resistance of the winding 36 would then determine, in conjunction with the values of the capacitors 30a and 30b, the duration of the output signals and the time spacing between them.

Turning now to FIG. 4, a four-input sensing apparatus is there depicted. In general, it is quite similar to FIG. 2, except it employs twice as many components. For example, there are four pick-up means or sensing switches 60a–d adapted to sense successive events occurring at four different locations. When each of these switches is unactuated, it creates a circuit for charging a corresponding one of four capacitors 60a–d through current limiting resistors 62a–d. The capacitors 61a–d form a part of four timing devices, which here take the form of discharge circuits established through the respective switches 60a–d when the latter are actuated, through the coils of four respective relays R3—R6, and four respective resistors 64a–d. Thus, in response to actuation of any of the switches 60a–d, its corresponding capacitor 61a–d will discharge and hold the corresponding relay R3—R6 energized for a predetermined time interval or cycle.

In order to inhibit or prevent the energization of any of the relays R3—R6 so long as any other of the relays is actuated, each relay coil R3—R6 is connected in series with three normally closed contacts controlled by the remaining three relays. That is, the relay coil R3 is connected in series with normally closed contacts R4a, R5a and R6a controlled by the relays R4, R5 and R6. In like manner, the relay coil R4 is connected in series with normally closed contacts R3b, R5b and R6b; the relay coil R5 is connected in series with normally closed contacts R3c, R4c and R6c; while the relay coil R6 is connected in series with normally closed contacts R3d, R4d and R5d.

The four signal shorteners illustrated in FIG. 4 take substantially the same form as the two signal shorteners illustrated in FIG. 2. That is, each of the relays R3—R6 controls a set of double-throw contacts R3e, R4e, R5e, and R6e, respectively, which when de-actuated create a path of charging four respective capacitors 65a–d through corresponding current limiting resistors 66a–d. When the contacts R3e, R4e, R5e or R6e are actuated, they connect the corresponding one of the capacitors 65a–d in parallel with a resistor 68, the time constant of the resulting discharge circuit being relatively short so that the output signal appearing on the output terminal 69 is of less duration than the time period through which the corresponding relay is held actuated.

FIG. 4 illustrates as an exemplary utilization apparatus, an amplifier 70 which receives the output signals from the terminal 39 and transmits corresponding current pulses through the energizing winding 71 of a counting device 72.

With the four multiple inputs to the apparatus of FIG. 4, as represented by the pick-up switches 60a–d, it is necessary to make certain that the utilization device 72 receives four consecutive signals even though all four of the switches 60a–d should be simultaneously closed. It will be recalled from the foregoing generalized explanation that if the maximum rate at which the utilization device 72 can accept signals is $f$ signals per second, then the time interval during which each of the pick-up means is actuated in response to an event which it senses should be at least $4/f$ seconds. That is, the number $n$ of inputs if four, so that under the general relationships noted above, the duration of switch actuation should be a minimum of $4/f$ seconds. The timing cycle for the timing device formed by the capacitors 61a–d and their discharge circuits is still chosen such that the relays R3—R6 when actuated will remain energized for a period of 1/f seconds. Also, the time constant of the discharge circuit formed by any of the four capacitors 65a–d and the resistor 68 is less than 1/f seconds. If for optimum operation the winding 61 of the utilization device 72 should be turned "off" by alternate periods equal in duration to periods that it is turned "on," then the resistor 68 should be small enough that the discharge of any of the capacitors 65a–d occurs in $\frac{1}{2}f$ seconds.

It will be seen, from the foregoing, that the present arrangement is one which assures that any number of events occurring simultaneously at different locations can be sensed and caused to produce a corresponding number of successive output signals. The events occurring at any one location, while being randomly spaced in time, should not be spaced apart by less than a predetermined time interval which is determined by the number of inputs and the rate at which the timing capacitors 61a–d can be recharged. For this reason, it is desirable to make the current limiting resistors 62a through 62d relatively small—as small as possible without creating an overload on the D.C. current supply. If the switch 60a has been actuated and the capacitor 61a discharged through the relay coil R3, after the switch 60a is restored it should not be actuated again until the capacitor 61a has had sufficient time to recharge. If this recharging time is assigned the symbol T, it will be seen that the switch 60a must be actuated for a minimum time of $4/f$ seconds, and de-actuated for a minimum time of T seconds. It becomes apparent, therefore, that the maximum frequency of events occurring at a single location should not exceed $$\frac{1}{4/f+T}$$

i.e., $$\frac{f}{4+fT}$$

events per second.

Placing this in a general expression, where $n$ pick-up devices sense events occurring at $n$ different locations, the pick-up devices are arranged to be actuated for a period of $n/f$ seconds in response to each event and to be de-actuated for $T$ seconds between successive events at one location. The maximum frequency of events occurring at one location is thus $$\frac{f}{n+fT}$$

where $f$ is the established maximum frequency of the output signals.

By employing a utilization device that can accept output signals at a relatively high frequency, and by reducing the recovery time $T$ of the timing devices (e.g., making the charging resistors 62a—62d very small), events which occur in rapid succession at the different locations can be accurately sensed.

I claim as my invention:

1. Multiple input sensing apparatus for producing one output signal discretely spaced in time relative to all other output signals in response to each of plural, randomly occurring, and even coincident events at a plurality of locations, said apparatus comprising, in combination, a plurality of pick-up devices and means for actuating each device in response to successive events occurring at one of said locations, a corresponding plurality of time measuring devices and means for actuating each one through one timing cycle whenever the corresponding one of said pick-up devices is actuated, means for preventing actuation of each of said time measuring devices so long as any other of such measuring devices is actuated, and plural means each responsive to actuation of one of said time measuring devices for producing an output signal of shorter duration than the timing cycle of said time measuring devices.

2. Multiple input apparatus for sensing random and even simultaneous events occurring successively at a plurality of $n$ locations and producing at a single output a corresponding number of non-coincident response signals at a maximum frequency of $f$ response signals per second, said apparatus comprising in combination, a plurality of $n$ pick-up devices one of which is actuated for a minimum period of $n/f$ seconds in response to each said event occurring at one of said locations, a corresponding plurality of time measuring devices each of which is actuated for a period of $1/f$ seconds in response to its corresponding pick-up device being actuated, means for preventing actuation of each said time measuring device so long as any other of the time measuring devices is actuated, and means for producing in response to actuation of each of said time measuring devices a response signal which is shorter in duration than $1/f$ seconds.

3. Multiple input sensing apparatus for producing response signals at a maximum frequency of $f$ signals per second, comprising, in combination, a plurality of $n$ pick-up devices adapted to be actuated for a period of $n/f$ seconds in response to successive occurrences at a corresponding plurality of $n$ locations, a corresponding plurality of time measuring devices each connected to be actuated through one timing cycle of $1/f$ seconds in response to actuation of a corresponding one of said pick-up devices, means for preventing actuation of each of said time measuring devices whenever any other of those devices is actuated, and means responsive to actuation of each of said time measuring devices for producing an output signal of $1/kf$ seconds in duration, where $k$ is a constant greater than 1, whereby one output signal spaced in time from the others is created for each of said occurrences, even though the latter are partially or totally coincident in time.

4. Multiple input sensing apparatus for producing one discrete response signal, at a maximum frequency of $f$ signals per second, for each one of events occurring randomly and successively at $n$ different locations, said apparatus comprising the combination of a plurality of $n$ pick-up devices each actuated for a minimum period of $n/f$ seconds in response to each event occurring at a corresponding one of said locations, a plurality of $n$ time measuring devices each connected to be actuated through one timing cycle of $1/f$ seconds in response to actuation of a corresponding one of said pick-up devices, means for inhibiting the actuation of each one of said time measuring devices for so long as any other of such devices is going through a timing cycle, and a plurality of $n$ means all connected to a single output terminal for producing in response to the actuation of a corresponding one of said time measuring devices an output signal shorter in duration than $1/f$ seconds.

5. Multiple input apparatus for discretely responding to each of successive events occurring at a plurality of locations, said apparatus comprising the combination of a plurality of pick-up devices and means for actuating each for a finite period in response to each event occurring at a corresponding one of said locations, a plurality of capacitors and means for charging each when a corresponding one of said pick-up devices is de-actuated, a discharging circuit for each capacitor and means for completing each such circuit when a corresponding one of said pick-up devices is actuated, said discharging circuits including means for causing the effective discharge to occur in less time than the finite period each pick-up device is actuated, means controlled by and during the discharge of each said capacitor for preventing the discharge of every other said capacitor, and means responsive to the discharge of each said capacitor for producing an output signal shorter in duration than the effective period of that discharge.

6. Multiple input apparatus for producing one discrete response signal, at a maximum frequency of $f$ signals per second, for each of successive events randomly occurring at $n$ different locations, said apparatus comprising the combination of a plurality of $n$ pick-up devices and means for actuating each for a minimum of $n/f$ seconds in response to each event occurring at a corresponding one of said locations, a plurality of $n$ capacitors and means for charging each when a corresponding one of said pick-up devices is unactuated, a plurality of $n$ relays each having a coil, means for discharging each said capacitor through a corresponding one of said relay coils when the corresponding pick-up device is actuated, said discharging means including means for causing such discharge to hold the relay actuated for a minimum of $1/f$ seconds, means for preventing the discharge of each said capacitor so long as any of said relays except the one corresponding to that capacitor is actuated, and means responsive to the actuation of each said relay for producing an output signal of duration shorter than $1/f$ seconds.

7. Multiple input apparatus for producing time spaced output signals at a maximum frequency of $f$ signals per second, there being one such output signal for each of successive events occurring randomly at a plurality of $n$ locations, said apparatus comprising the combination of $n$ pick-up devices, means for actuating each such device for a minimum of $n/f$ seconds in response to events at a corresponding one of said locations, a plurality of $n$ capacitors and means for charging each when a corresponding one of said pick-up devices is unactuated, means for producing a discharge of predetermined time duration from each of said capacitors when the corresponding pick-up device is actuated, a plurality of $n$ relays, means responsive to the discharge of each said capacitor for actuating a corresponding one of said relays for a minimum period of $1/f$ seconds, means for inhibiting the discharge of each said capacitor for so long as any of said relays except the one corresponding to that capacitor is actuated, a second plurality of $n$ capacitors, means for charging each of said second capacitors when a corresponding one of said relays is unactuated, and means responsive to actuation of each said relay for discharging the corresponding one of said second capacitors through a common load, the time constant for each capacitor in the common load being shorter than $1/f$ second.

References Cited in the file of this patent

UNITED STATES PATENTS

| | | |
|---|---|---|
| 2,146,862 | Shumard | Feb. 14, 1939 |
| 2,287,786 | Diamond et al. | June 30, 1942 |
| 2,673,293 | Eckert et al. | Mar. 23, 1954 |
| 2,701,301 | Mullarkey | Feb. 1, 1955 |
| 2,753,546 | Knowles | July 3, 1956 |
| 2,792,525 | McArdle | May 14, 1957 |
| 2,831,635 | Strandberg | Apr. 22, 1958 |

FOREIGN PATENTS

| | | |
|---|---|---|
| 1,097,934 | France | Apr. 9, 1954 |
| 128,537 | Australia | July 28, 1948 |